United States Patent

Dreyfert et al.

[11] Patent Number: 6,055,311
[45] Date of Patent: Apr. 25, 2000

[54] DYNAMIC ECHO CANCELLER AND PARAMETER SELECTION IN TELEPHONY SYSTEMS

[75] Inventors: Torkel Dreyfert, Täby, Sweden; Petros Ortolanis, Aachen, Germany

[73] Assignee: Telefonaktiebolaget L M Ericsson (publ), Stockholm, Sweden

[21] Appl. No.: 08/792,866

[22] Filed: Jan. 31, 1997

[51] Int. Cl.$^7$ ........................................ H04M 1/00
[52] U.S. Cl. .......................... 379/410; 379/406; 370/286
[58] Field of Search .................... 379/406, 407, 379/410, 411; 370/287, 290, 291, 477, 286

[56] References Cited

U.S. PATENT DOCUMENTS

| | | | |
|---|---|---|---|
| 3,769,466 | 10/1973 | Von Pfeil et al. | |
| 4,658,420 | 4/1987 | Fukushi et al. | 379/407 |
| 5,247,512 | 9/1993 | Sugaya et al. | 370/32.1 |
| 5,333,195 | 7/1994 | Bowker et al. | 379/410 |
| 5,400,394 | 3/1995 | Raman et al. | 379/88 |
| 5,473,686 | 12/1995 | Virdee | 379/410 |
| 5,511,064 | 4/1996 | Oh et al. | 370/15 |
| 5,689,556 | 11/1997 | Gupta et al. | 379/410 |

FOREIGN PATENT DOCUMENTS

| | | |
|---|---|---|
| 0 439 139 A2 | 1/1991 | European Pat. Off. |
| 3159423 | 7/1991 | Japan . |
| 05083753 | 2/1993 | Japan . |
| 06315046 | 8/1994 | Japan . |
| 7288493 | 10/1995 | Japan . |
| WO 93/09610 | 5/1993 | WIPO . |

OTHER PUBLICATIONS

IEEE communication magazine, "Echo cancellation and application", K. Murano et al., p. 49, Jan. 1990.
A Double Talk Detector Based on Coherence by Tomas Gänsler, Maria Hansson and Göran Salomonsson; Signal Processing Group, Dept. of Elec. Eng. and Comp. Science Lund University, Box 118, S–221 00 Lund, Sweden; pp. 332–336; Proceedings of the 6th International Conference on Signal Processing Applications & Technology, Boston, MA, Oct. 24–26, 1995.
Echo Canceler with Two Echo Path Models by Kazuo Ochiai, Takashi Araseki and Takashi Ogihara IEEE Transactions on Communications, vol. Com–25, No. 6, Jun. 1977 pp. 589–595.

*Primary Examiner*—N. Le
*Assistant Examiner*—Shin-Wen Hsieh
*Attorney, Agent, or Firm*—Jenkens & Gilchrist, P.C.

[57] ABSTRACT

An echo canceller pool configuration is provided that allows a user to predetermine and individualize the echo cancellation parameter settings for any echo canceller in the pool, based on prior knowledge of the echo path characteristics of the specific transmission route to be used for an ensuing call. The echo canceller with the individualized parameter settings is then switched into that route for the duration of the call. For example, at call setup, once a trunk route has been identified that will be used to complete the call, a "flag" is retrieved that is associated with that specific route. That "flag" identifies specific echo canceller parameter settings to be used for that route. Those parameter settings are downloaded to the echo canceller device selected from the pool, and that device is then switched into the specific trunk involved. An operator can thereby optimize echo cancellation in the system and significantly improve speech quality overall.

28 Claims, 8 Drawing Sheets

DYNAMIC ECHO CANCELLER AND PARAMETER SELECTION IN TELEPHONY SYSTEMS

BACKGROUND OF THE INVENTION

1. Technical Field of the Invention

The present invention relates in general to the telecommunications field and, in particular, to the dynamic selection of echo cancellers and echo cancellation parameters in telephony systems.

2. Description of Related Art

Speech quality has become a highly competitive factor in marketing telephony systems. Echo, which is a phenomenon typically caused by imperfect impedance matching of network transmission sections, has a significant impact on the overall speech quality of telephony systems. Specifically, the primary cause of echo in many telephony systems is the impedance mismatch between connected two-wire and four-wire network transmission sections.

For example, FIG. 1 is a schematic block diagram that illustrates how echo can occur in a Public Switched Telephone Network (PSTN). As shown in a typical arrangement, a PSTN subscriber's telephone 1 is connected by a two-wire transmission line to a hybrid interface circuit 1'. The hybrid circuit (1') functions to convert from the telephone's two-wire access line to the PSTN's four-wire transmission line (needed for two-way communications). Similarly, a second PSTN subscriber's telephone 2 is connected by a two-wire transmission line to a second hybrid circuit 2', which also makes the two-wire to four-wire conversion. Since each hybrid is a non-ideal circuit, an impedance mismatch occurs at each hybrid (1', 2') between the two-wire lines and four-wire line, which reflects a portion of the incoming speech energy from the four-wire line back to each of the respective subscriber's phones (1, 2). This reflected speech energy, or echo, is typically a distorted and delayed replica of the outgoing speech reflected from the other subscriber side. In FIG. 1, the respective energy reflections (echos) for subscriber's 1 and 2 are illustrated by the dotted arrows 1" and 2".

In general, as long as the reflected energy transmission delay time is relatively short (e.g., $\leq 25$ ms), the reflected speech energy is normally not perceived to be annoying. However, when the delay is increased beyond 25 ms, the reflected energy is normally perceived as an annoying "talker echo". The higher the delay time, the more annoying and/or confusing the echo becomes. For example, FIG. 2 is a graph that illustrates the required echo attenuation needed as a function of transmission delay time. As shown, the total echo return loss (ERL) can be plotted as a function of delay time to generate an echo tolerance curve. As the delay increases above 25 ms, echo control procedures are required.

In summary, echos become more annoying as network transmission path delay times are increased. Such transmission path delays can be introduced in a number of ways, such as by propagating speech signals over long distances, or by the process of coding transmitted speech signals. For example, significant propagation delays occur during satellite communication transmissions for intra- and intercontinental calls. A geostationary satellite (due to its substantial distance from the earth) typically introduces a one-way transmission path delay of about 260 ms, or a total (round-trip) echo path delay of about 520 ms. FIG. 3 is a diagram that shows a satellite communications link and illustrates how such a system introduces a significant transmission (echo) path delay.

Digital cellular communications systems also introduce significant echo path delays. For example, the speech and channel coding used for fault tolerance in digital cellular communications system radio transmissions introduces a one-way transmission path delay of about 100 ms, as blocks of speech samples are transmitted and re-transmitted over the air interface. FIG. 4 is a diagram that shows a digital cellular communications system and illustrates such an echo path delay.

Echo cancellers are electronic devices that are used to suppress the effects of echos in telephony systems. For example, for connections with long transmission delays between subscribers (e.g., FIG. 1), two echo cancellers are typically used (one on either side of the transmission path that causes the delay). For long distance satellite communications systems (e.g., FIG. 3) that link to PSTNs, an echo canceller is typically located at each of the gateway switches or transit nodes (e.g., at the international switching centers or ISCs) associated with each local exchange, but "facing" the respective PSTN. In a digital cellular communications system (e.g., FIG. 4) that links to a PSTN, an echo canceller is typically located at a mobile services switching center (MSC) and also "facing" the PSTN.

FIG. 5 is a simplified schematic block diagram that illustrates two echo canceller configurations that can be used in existing telephony systems: (1) trunk echo cancellers, and (2) echo cancellers in a pool (ECP) configuration. In the examples illustrated by FIG. 5, three trunk lines (2, 4, 8) are shown, each of which connects a PSTN (11) transmission line to a digital cellular system 12 via a group switch (e.g., part of an MSC) 10 for speech communications therebetween. Group switch 10 can be a component of a digital switching system, such as, for example, an AXE 10 digital switching system manufactured by Ericsson Telecom AB. An echo canceller device 14 is physically connected to trunk line 2. The electrical parameter settings for trunk echo canceller 14 are controlled by echo canceller control circuit 16. An exchange terminal circuit 18 is connected between trunk echo canceller 14 and group switch 10.

An echo canceller pool 30 is associated with group switch 10. A plurality of echo cancellers are maintained in the pool (30) to form a part of the trunk signalling subsystem (TSS) of the digital switching system. A conventional echo canceller pool 30 can be, for example, an ECP 101 product, which is manufactured by Ericsson Telecom AB. As shown, no trunk echo canceller is physically located at trunk 8. Instead, when a call is initiated between the PSTN (11) and the digital cellular system (12), the traffic control subsystem (TCS) of the digital switching system selects one of the echo cancellers in the pool (30) and directs switch 10 to route the connection through the selected echo canceller for the duration of the call. In that way, a more efficient use of echo cancellers is possible and thus reduces the total number of echo cancellers needed, as compared to prior trunk echo canceller configurations. Also, there is increased reliability over the prior systems, because there are always some echo cancellers available in the pool, which can be used in the event one or more of the other echo cancellers develops a fault.

Although the use of echo canceller pool configurations has increased the flexibility and reliability of existing telephony systems, a significant problem still exists with respect to echo cancellation. Specifically, all of the echo cancellers in each existing pool are configured with the same cancellation parameters, which significantly limits the flexibility of existing telephony systems.

SUMMARY OF THE INVENTION

It is, therefore, an object of the present invention to provide individualized echo cancellation parameter settings for specific echo cancellers in a pool.

It is also an object of the present invention to provide a dedicated pool of echo cancellers for certain high priority transmission paths in a telephony system.

It is another object of the present invention to customize echo cancellers for specific trunk routes in a telephony system.

It is yet another object of the present invention to create a congestion-free pool of echo cancellation devices.

It is a further object of the present invention to minimize echo and thereby improve the speech quality of telephony systems.

In accordance with the present invention, the foregoing and other objects are achieved by a method and apparatus, in which an echo canceller pool configuration is provided that allows a user to predetermine and individualize the echo cancellation parameter settings for any echo canceller in the pool, based on prior knowledge of the echo path characteristics of the specific transmission route to be used for an ensuing call. The echo canceller with the individualized parameter settings is then switched into that route for the duration of the call. For example, at call setup, once a trunk route has been identified that will be used to complete the call, a traffic control system retrieves a "flag" from a memory address associated with that specific route. That "flag" identifies specific echo canceller parameter settings to be used for that route. Those parameter settings are downloaded to the echo canceller device selected from the pool, and that device is then inserted into the specific trunk involved.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

The preferred embodiment of the present invention and its advantages are best understood by referring to FIGS. 1–8 of the drawings, like numerals being used for like and corresponding parts of the various drawings.

Essentially, an echo canceller pool configuration is provided that allows a user to predetermine and individualize the echo cancellation parameter settings for any echo canceller in the pool, based on prior knowledge of the echo path characteristics of the specific transmission route to be used for an upcoming call. The echo canceller with the individualized parameter settings is then switched into that route for the duration of the call. For example, at call setup, once a trunk route has been identified that will be used to complete the call, a traffic control system retrieves a "flag" from a memory address associated with that specific route. That "flag" includes specific echo canceller parameter settings for that route. Those parameter settings are downloaded to the echo canceller device selected from the pool, and that device is then inserted into the specific trunk involved.

Figure 1:
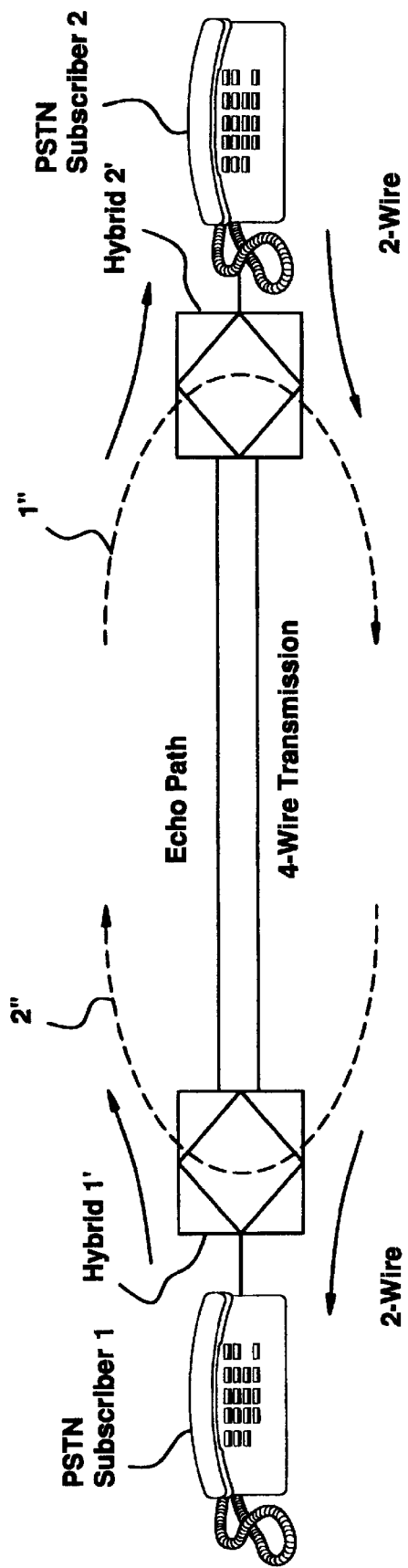
FIG. 1 is a schematic block diagram that illustrates how echo can occur in a Public Switched Telephone Network.
Figure 2:
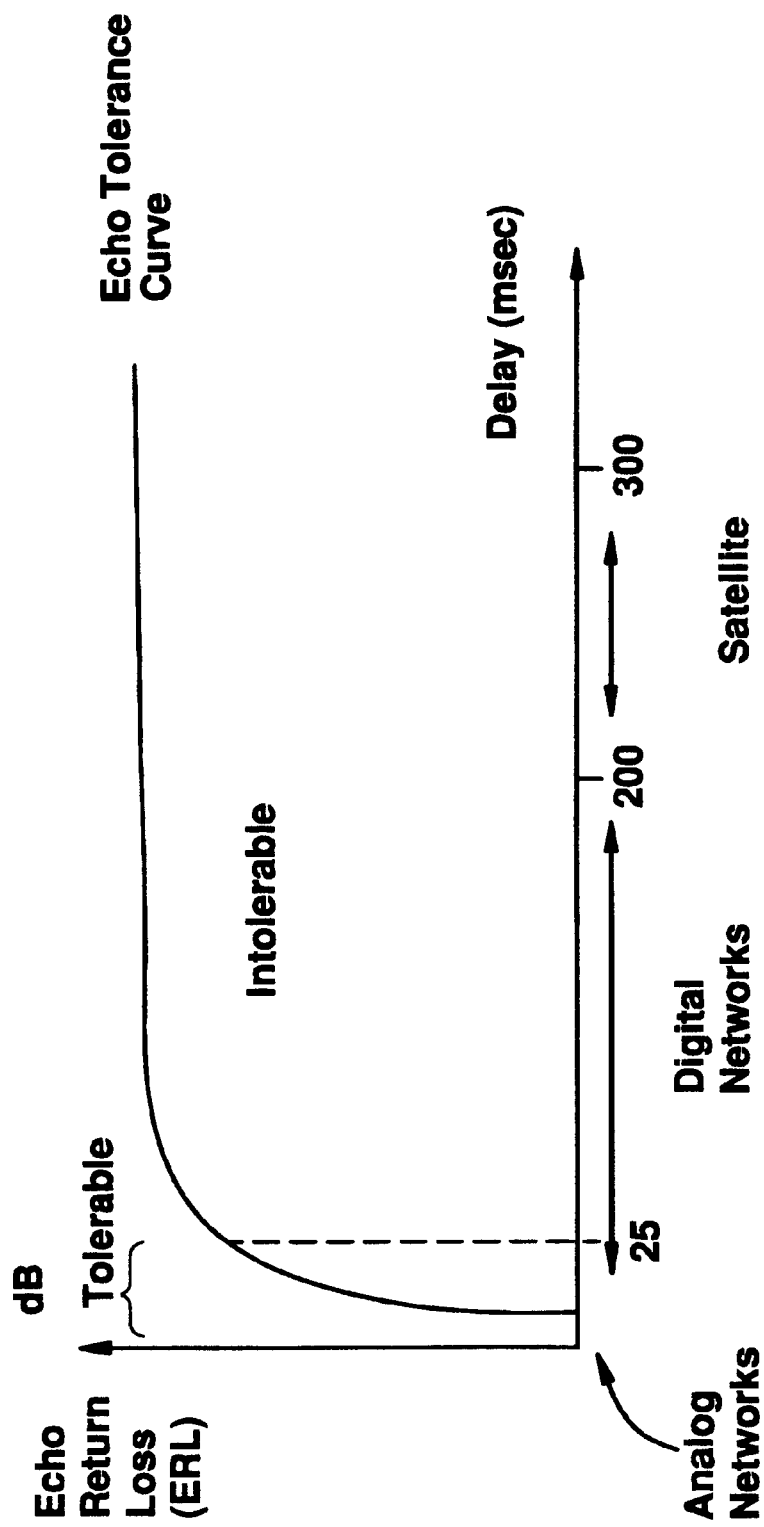
FIG. 2 is a graph that illustrates the required echo attenuation needed as a function of transmission delay time.
Figure 3:
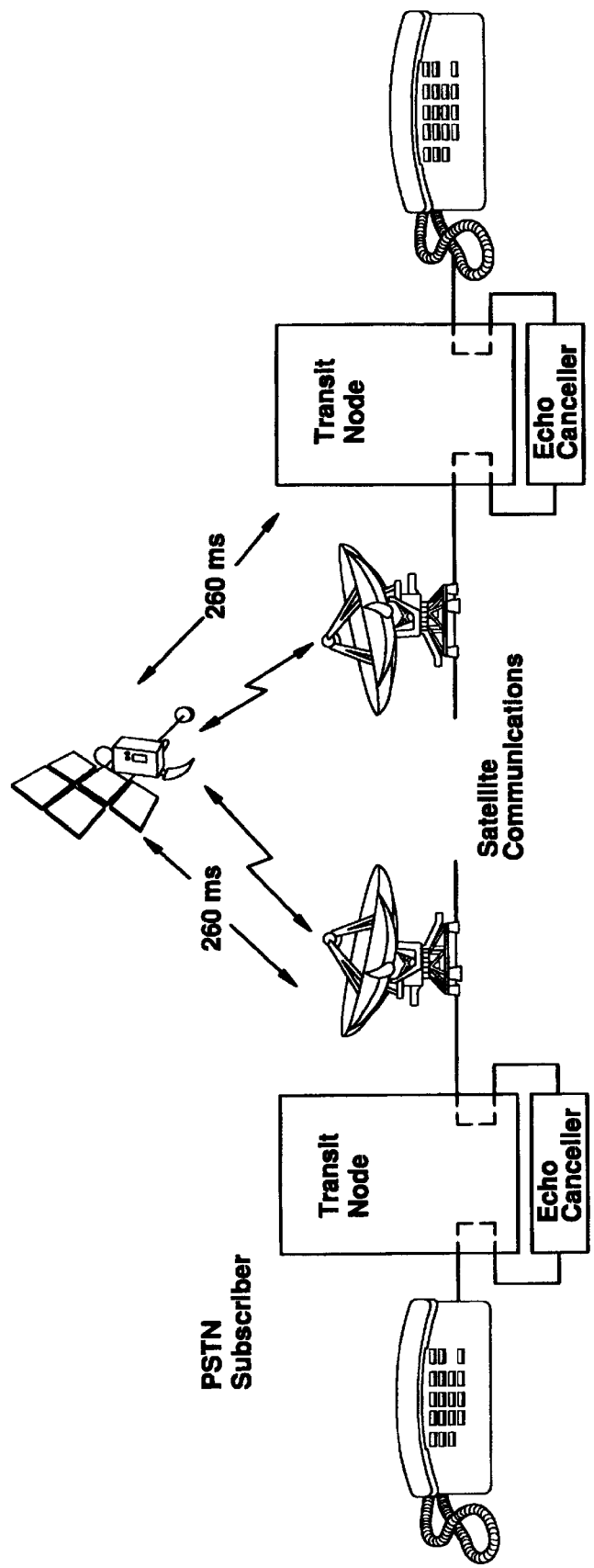
FIG. 3 is a diagram that shows a satellite communications link and illustrates how such a system introduces a significant transmission (echo) path delay.
Figure 4:
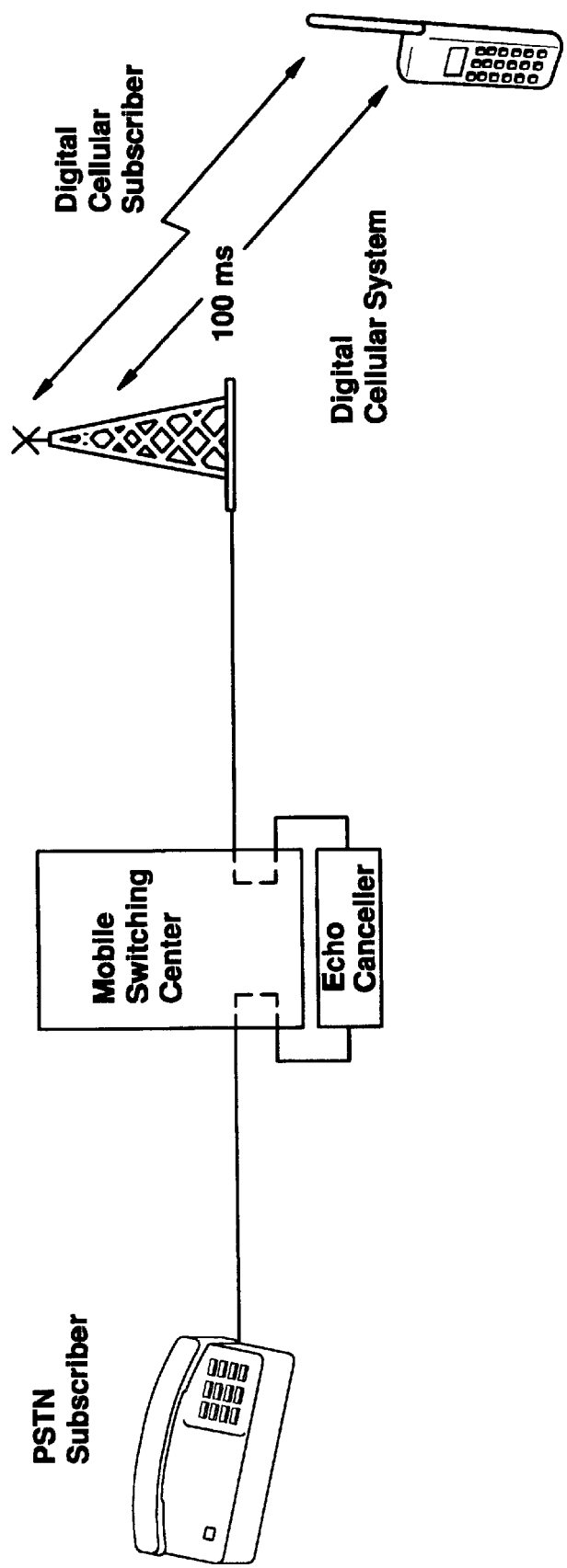
FIG. 4 is a diagram that shows a digital cellular communications system and illustrates an echo path delay.
Figure 5:
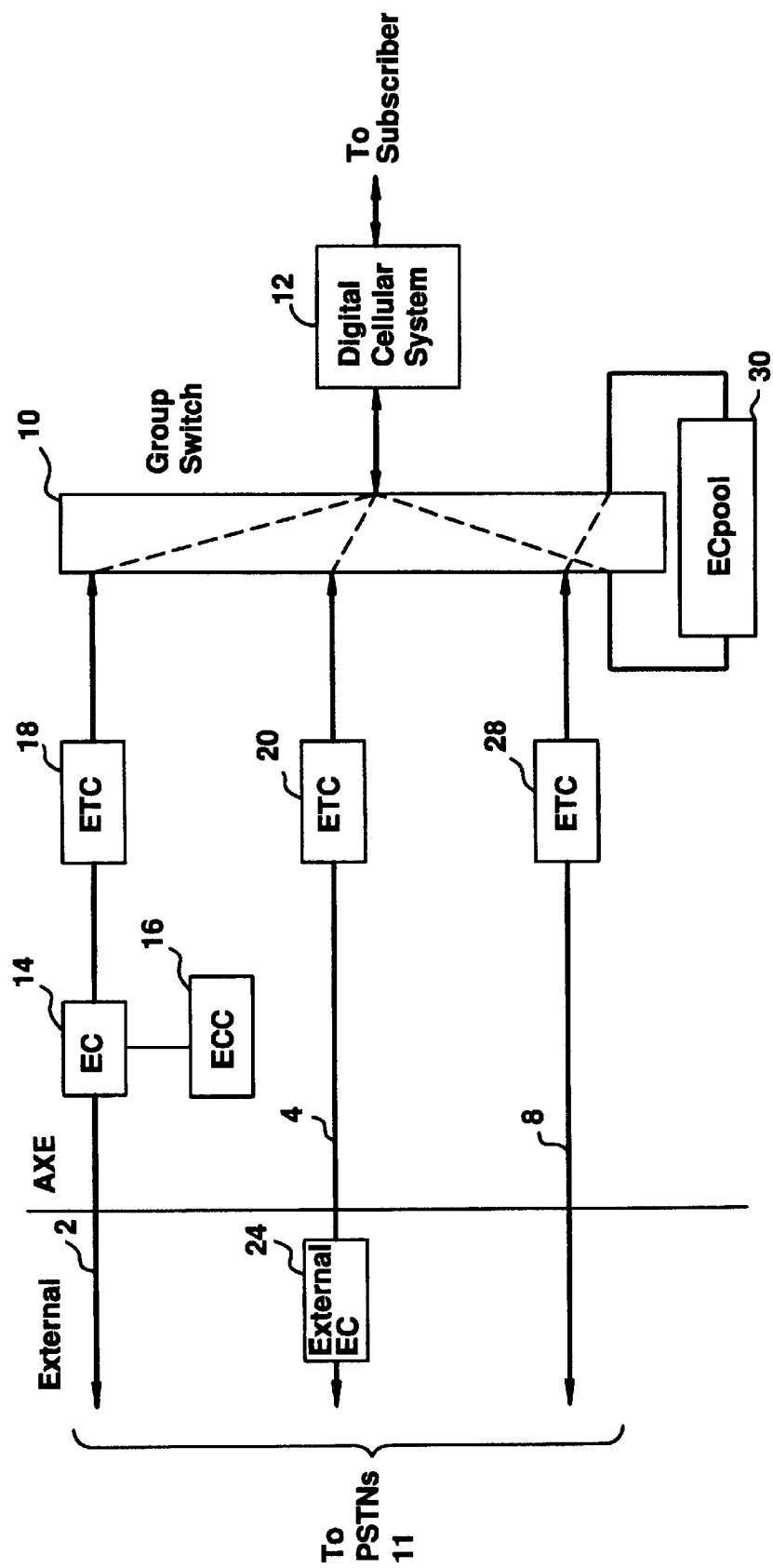
FIG. 5 is a simplified schematic block diagram that illustrates two echo canceller configurations that can be used in existing telephony systems.
Figure 6:
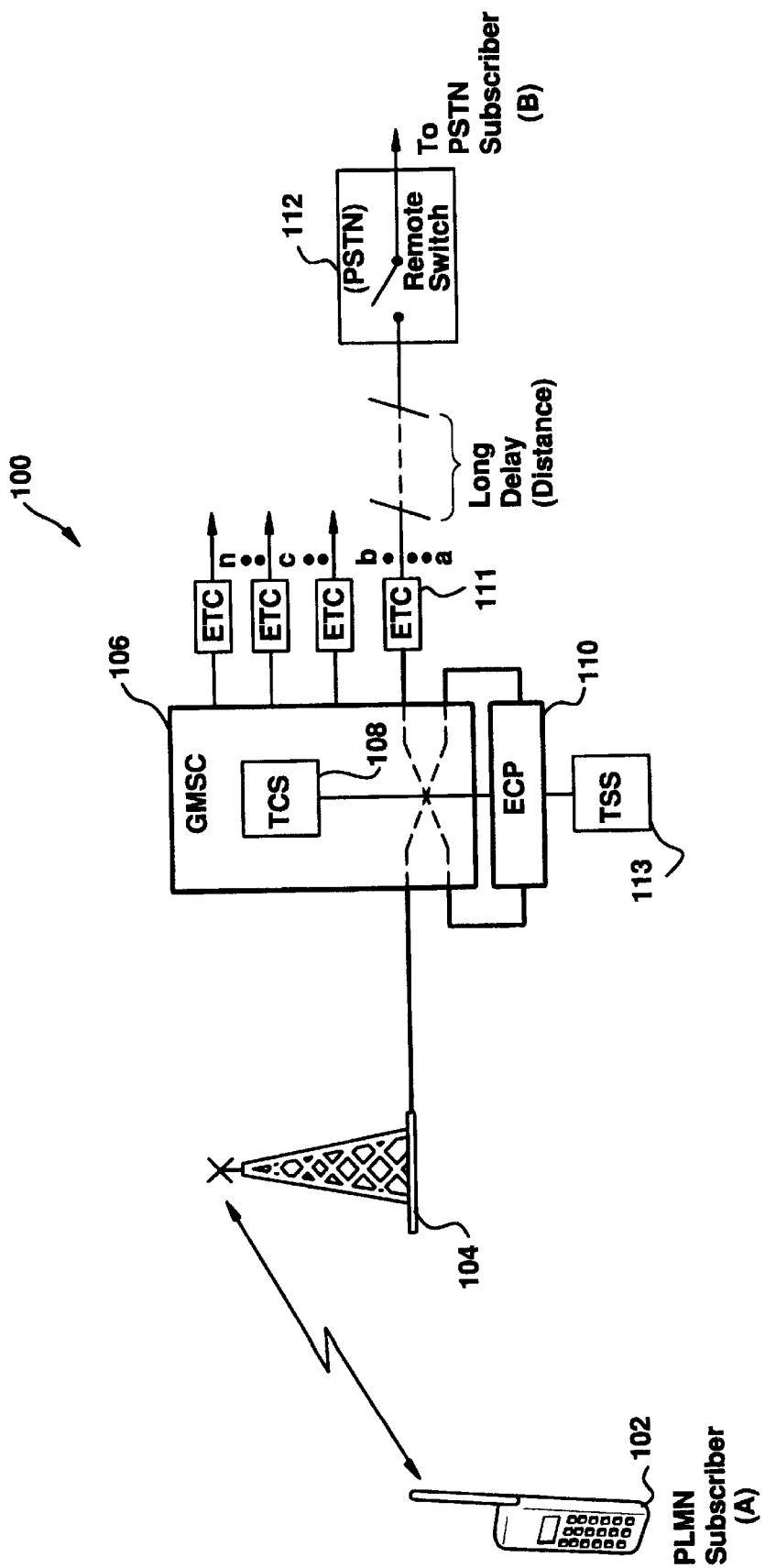
FIG. 6 is a schematic block diagram of an exemplary cellular communications system that may be used for dynamically selecting echo cancellers and echo cancellation parameter settings, in accordance with a preferred embodiment of the present invention.

Specifically, FIG. 6 is a schematic block diagram of an exemplary cellular communications system that may be used for dynamically selecting echo cancellers and echo cancellation parameter settings, in accordance with a preferred embodiment of the present invention. System 100 can include a plurality of mobile terminals, one or more base station transceivers, and one or more MSCs or gateway MSCs associated with the base station transceivers. Each gateway MSC can have an associated echo canceller pool. However, since only one routing connection between users needs to be shown to adequately describe the invention, the system shown in FIG. 6 includes a mobile terminal (e.g., cellular phone) 102, a base station transceiver 104 for communicating with mobile terminal 102 via the air interface, a gateway MSC 106 connected to base station transceiver 104, and an echo canceller pool 110 connected to gateway MSC 106.

In this embodiment, a traffic control subsystem 108 is associated with gateway MSC 106 and echo canceller pool 110. The traffic control subsystem can be implemented entirely in software and contains the traffic-handling and traffic-control functions of the switch involved. The software functions of the traffic control subsystem can be implemented under the control of a digital processor (not explicitly shown) associated with the gateway MSC. The gateway MSC (106) is connected via a transmission line to an exchange terminal circuit 111, and a trunk line to a remote switch 112 (e.g., a switch in a PSTN exchange).

As shown, the gateway MSC (106) can connect the base station transceiver (104) and the echo cancellers in the pool (110) to any one of a plurality of trunk lines. Also, although remote switch 112 is shown as a PSTN switch, the invention is not intended to be so limited. For example, the gateway MSC (106) can be connected via a transmission line to another MSC or switch in system 100 or to a switch in a different cellular system.

In operation, and in accordance with the exemplary embodiment shown in FIG. 6, a call is made by a cellular subscriber (A) on mobile phone 102, which is to be directed to a fixed telephone (not explicitly shown) of a PSTN subscriber (B). At call setup, the calling party (A) and called party (B) identification information is received by base station transceiver 104, as part of a call control message using a standard air interface call control message protocol. This information is coupled to the gateway MSC 106 and analyzed by the traffic control subsystem 108. Once the called party (B) has been identified, the traffic control subsystem (108) conducts a route analysis and associates that called party with a specific route (e.g., from switch to switch) via a trunk line to that party's location.

In this embodiment, the traffic control subsystem (108) determines that the specific trunk route to follow to subscriber B is via the trunk line from exchange terminal circuit 111 to remote switch 112. Once that specific trunk route has been identified, the traffic control subsystem (108) accesses a database (not explicitly shown) and retrieves pertinent transmission characteristics (e.g. predefined by a system operator) about that route. That route information includes, at a minimum, a "flag" or data field that contains known echo path characteristics for that route. The traffic control system can thereby predetermine the precise echo path characteristics of the trunk route that will be used to complete the call.

Depending on the echo path delay characteristics of the trunk route involved, the trunk signalling subsystem 113 can select an echo canceller device (not explicitly shown) from the echo canceller pool (110) to be inserted into that trunk, in order to handle that echo path delay. Notably, in accordance with the present invention, the trunk signalling subsystem also selects the echo cancellation parameters to be used in the echo canceller device selected for that particular route. The parameters used can be the typical default values provided for all of the echo canceller devices in the pool, or more importantly, they can be individualized parameters designed more precisely for the specific trunk route involved. For this embodiment, the echo canceller pool (110) can be an ECP 303/404 product manufactured by Ericsson Telecom AB. The echo canceller device used can be a type C Echo Canceller, as specified by the International Telecommunications Union (ITU) in ITU-T Recommendation G.165, March 1993, entitled "Echo Cancellers". Using the individualized echo cancellation parameter settings for the specific route involved, the traffic control subsystem (108) and trunk signalling subsystem (113) thereby function to complete a significantly improved speech quality connection between cellular subscriber A and PSTN subscriber B, as compared to prior systems.

Figure 7:
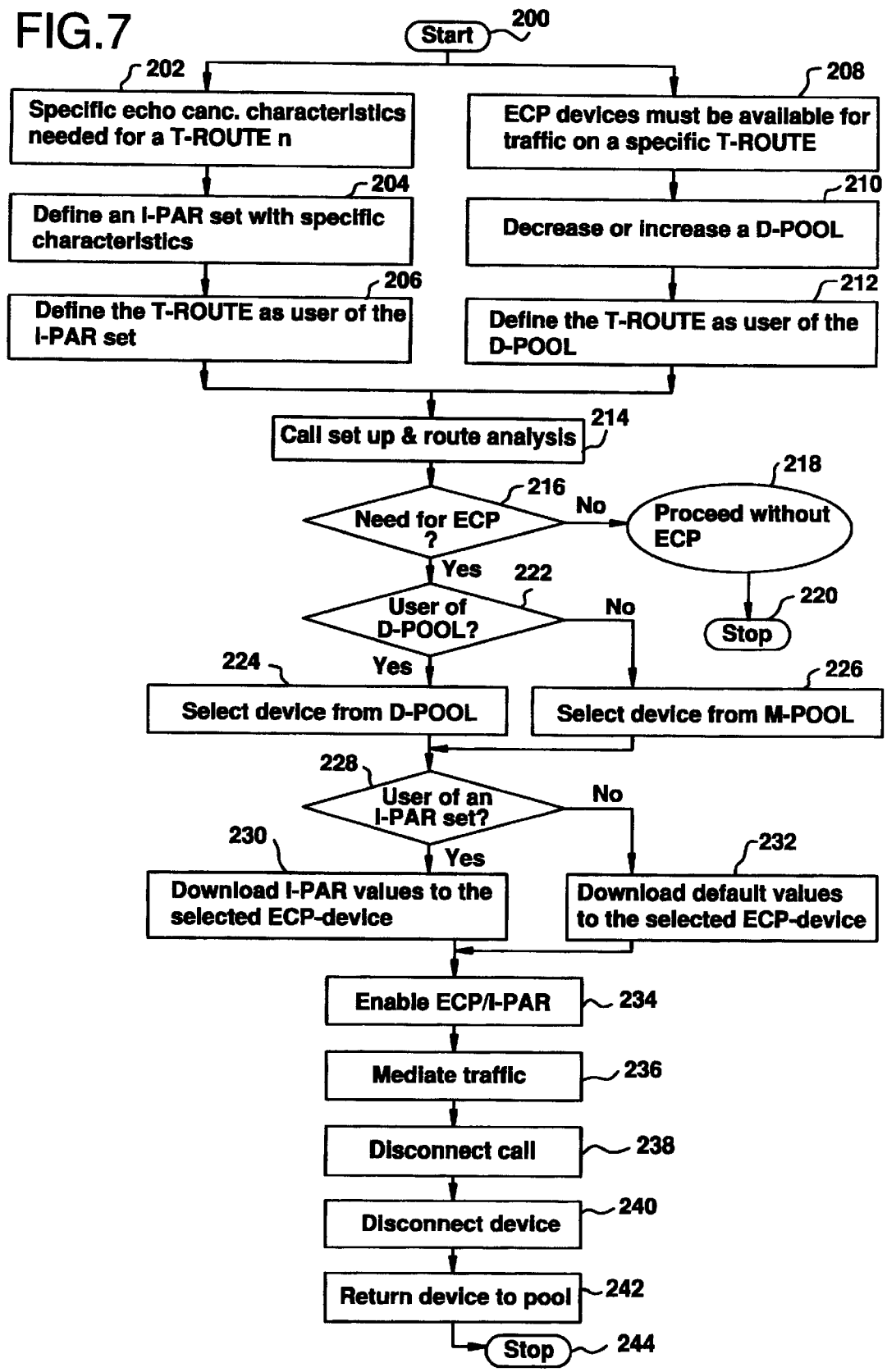
FIG. 7 is a flow chart that illustrates a method that can be used to implement dynamic selection of an echo canceller and individualized echo cancellation parameters for a specific route, in accordance with the preferred embodiment of the present invention.

FIG. 7 is a flow chart that illustrates a method that can be used to implement dynamic selection of an echo canceller and individualized echo cancellation parameters for a specific route, in accordance with the preferred embodiment of the present invention. Preferably, a predetermined percentage of the echo cancellers in the pool are defined (e.g., by a system operator) as belonging to a dedicated pool. The remaining echo cancellers, which are not allocated to the dedicated pool, are defined as belonging to a main pool. The use of a dedicated pool of echo cancellers makes it possible for an operator to allow only high priority trunk routes the use of echo cancellers from the dedicated pool. Consequently, if all of the echo cancellers in the main pool are being used, there are still echo cancellers available from the dedicated pool for use in the high priority routes.

Figure 8:
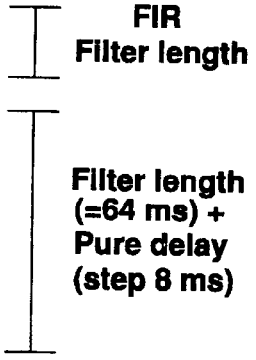
FIG. 8 is a table that shows exemplary echo canceller parameters and values that can be set for a trunk route, in accordance with the preferred embodiment of the present invention.

For this embodiment, assume that the specific outgoing, long distance trunk (T-ROUTE, n) from gateway MSC 106 to remote switch 112 has been "flagged" as requiring individually defined parameter settings for an echo canceller to be selected and used from the pool (110). Although there are a number of echo cancellation parameters that may be selected (e.g., end path delay, non-linear processor mode, tone disable mode, pulse code modulation encoder law, etc.) for a specific trunk route, the method described herein only illustrates the use of individualized end path delay settings for the specific outgoing trunk route shown in FIG. 6. However, it should be understood that the method of FIG. 7 can also be applied for any trunk route in FIG. 6 and any or all of the possible echo canceller parameters. Examples of echo canceller parameters and values that can be set for any trunk route are shown in the table of FIG. 8. As such, an operator can specify any or all of the echo canceller parameter settings for each outgoing route, and thereby significantly improve the overall speech quality of the telephony system.

For this illustrative embodiment, it may be assumed that an operator desires to set the specific echo cancellation parameter "end path delay" to 128 ms for the particular T-ROUTE shown in FIG. 6. However, setting the "end path delay" parameter to 128 ms actually functions to set the "length" of an adaptive Finite-Impulse-Response (FIR) filter to 128 ms, in the echo canceller that will be selected from the pool (110).

Returning to FIG. 7, at step 202, a system operator inputs appropriate commands to specify and store in a memory storage location (e.g., relational database) the specific echo cancellation characteristics needed for any or all trunk routes (from the gateway switch to the next respective switch) in the system. In the preferred embodiment, such commands can be made by using, for example, a set of Man-Machine Language (MML) commands. At step 204, an operator defines and stores (e.g., in the relational database) as data transcripts for the system's trunk signalling subsystem (e.g., TSS 113), a set of individual parameters for the specific echo cancellation characteristics specified in step 202. At step 206, an operator defines and stores as data transcripts for the system's traffic control subsystem (e.g., TCS 108), information which specifies that the specific T-ROUTE involved can use the individual parameter set defined and stored for that route.

At step 208, an operator determines whether or not enough echo cancellers are available in the pool (110) to handle traffic via the specific T-ROUTE involved. At step 210, depending on whether or not enough echo cancellers are available in the pool, the operator inputs as data transcripts for the trunk signalling subsystem information that will either decrease or increase an already created dedicated pool. At step 212, the operator inputs as data transcripts for the traffic control subsystem information to allow the specific T-ROUTE involved to use an echo canceller from the dedicated pool.

At step 214, at the onset of a call from subscriber A to PSTN subscriber B, the traffic control subsystem performs a standard call setup procedure and route analysis. At step 216, based on the results of the route analysis performed, the traffic control subsystem determines whether or not an echo canceller pool is needed to cancel echo on the T-ROUTE involved. If not (e.g., a trunk echo canceller is already being used), at step 218, the connection can be made between subscriber A and B without using an echo canceller from the pool, and the present method can be terminated (220). If, however, at step 216, the traffic control subsystem determines that an echo canceller from the pool is needed for the T-ROUTE involved, then at step 222, both the traffic control subsystem and trunk signalling subsystem determine whether or not the specific T-ROUTE involved is allowed to use the dedicated pool (e.g., based on the priority level afforded to that T-ROUTE). If so, as in this illustration, at step 224, the trunk signalling subsystem selects an echo canceller from the dedicated pool. Otherwise, if the T-ROUTE involved has been afforded no particular priority of use, the trunk signalling subsystem selects an echo canceller from the main pool (226).

At step 228, the trunk signalling subsystem determines whether or not the T-ROUTE involved has been defined as a user of individual parameter settings. If so (as in this illustration), at step 230, the trunk signalling subsystem downloads the predefined individual parameters (e.g., 128 ms echo path delay) to the echo canceller device selected from the dedicated or main pool (step 224 or 226), which can be employed under the control of a digital processor, such as, for example, a Digital Signal Processor (DSP) manufactured by Texas Instruments Incorporated. Otherwise, at step 232, the trunk signalling subsystem downloads the default parameters to the echo canceller device selected from the pool.

At step 234, the trunk signalling subsystem enables operation of the echo canceller selected from the dedicated or main pool, along with the individualized echo cancellation parameters, on the specific T-ROUTE involved. At step 236, for the duration of the call, the trunk signalling subsystem mediates the two-way traffic between subscriber A and PSTN subscriber B via the specific T-ROUTE involved. When the call is terminated, at step 238, the traffic control subsystem disconnects the call. At step 240, the traffic control subsystem and trunk signalling subsystem disconnect the echo canceller device from the T-ROUTE involved, and at step 242, the trunk signalling subsystem returns that device to the respective dedicated or main pool. The method of dynamically selecting an echo canceller from a dedicated or main pool and operating it with optimal echo cancellation parameter settings tailored for the specific trunk route involved is then terminated (244).

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for improving the quality of speech traffic in a telephony system, comprising the steps of:
    determining an identity of a transmission route to be used for routing said speech traffic in said telephony system;
    selecting an echo canceller from a plurality of echo cancellers;
    selecting an echo cancellation parameter from a plurality of echo cancellation parameters, said echo cancellation parameter associated with said transmission route;
    transferring said echo cancellation parameter to said echo canceller, said echo canceller thereby operating responsive to said echo cancellation parameter; and
    coupling said echo canceller to said transmission route.

2. The method of claim 1, wherein said echo cancellation parameter comprises an end path delay.

3. The method of claim 1, wherein said echo cancellation parameter comprises a length of an adaptive Finite-Impulse-Response filter.

4. The method of claim 1, wherein said echo cancellation parameter comprises a Pulse Code Modulation (PCM) encoder law type.

5. The method of claim 4, wherein said echo cancellation parameter comprises a Pulse Code Modulation (PCM) encoder A-law.

6. The method of claim 4, wherein said echo cancellation parameter comprises a Pulse Code Modulation (PCM) encoder Mu-law.

7. The method of claim 1, wherein said echo cancellation parameter comprises a non linear processor mode of off, without hearing comfort.

8. The method of claim 1, wherein said echo cancellation parameter comprises a non linear processor mode of on, without hearing comfort.

9. The method of claim 1, wherein said echo cancellation parameter comprises a non linear processor mode of on, with hearing comfort.

10. The method of claim 1, wherein said echo cancellation parameter comprises a tone disabler mode of off.

11. The method of claim 1, wherein said echo cancellation parameter comprises an echo suppressor mode of on.

12. The method of claim 1, wherein said echo cancellation parameter comprises an echo canceller mode of on.

13. The method of claim 1, wherein said transmission route comprises a trunk line.

14. The method of claim 1, wherein said plurality of echo cancellers comprises a main pool of echo cancellers.

15. The method of claim 1, wherein said plurality of echo cancellers comprises a dedicated pool of echo cancellers.

16. The method of claim 15, wherein said transmission route comprises a prioritized transmission route.

17. The method of claim 1, wherein said telephony system comprises a cellular communications system.

18. The method of claim 1, wherein said telephony system comprises a satellite communications system.

19. The method of claim 1, wherein said telephony system includes a Public Switched Telephone Network.

20. An apparatus for use in improving the quality of speech traffic in a telephony system, comprising:
    an electronic switch for routing said speech traffic over a transmission route in said telephony system;
    means coupled to said electronic switch, for selecting an echo canceller from a pool of echo cancellers;
    means for selecting an echo cancellation parameter from a plurality of echo cancellation parameters associated with said transmission route;
    means for transferring said echo cancellation parameter to said echo canceller; and
    means associated with said electronic switch, for coupling said echo canceller to said transmission route.

21. The apparatus of claim 20, wherein said echo cancellation parameter comprises an end path delay.

22. The apparatus of claim 20, wherein said echo cancellation parameter comprises a length of an adaptive Finite-Impulse-Response filter.

23. The apparatus of claim 20, wherein said transmission route comprises a trunk line.

24. The apparatus of claim 20, wherein said pool of echo cancellers comprises a dedicated pool of echo cancellers.

25. The apparatus of claim 24, wherein said transmission route comprises a prioritized transmission route.

26. The apparatus of claim 20, wherein said telephony system comprises a cellular communications system.

27. The apparatus of claim 20, wherein said telephony system comprises a satellite communications system.

28. The apparatus of claim 20, wherein said telephony system includes a Public Switched Telephone Network.

* * * * *